United States Patent [19]

Wawrzyniak

[11] Patent Number: 4,476,613
[45] Date of Patent: * Oct. 16, 1984

[54] FACING HEAD

[76] Inventor: Walter W. Wawrzyniak, 39230 Gary, Mt. Clemens, Mich. 48043

[*] Notice: The portion of the term of this patent subsequent to Jan. 25, 1994 has been disclaimed.

[21] Appl. No.: 138,226

[22] Filed: Apr. 7, 1980

Related U.S. Application Data

[60] Division of Ser. No. 762,302, Jan. 25, 1977, Pat. No. 4,197,040, which is a continuation-in-part of Ser. No. 641,937, Dec. 18, 1975, Pat. No. 4,004,332.

[51] Int. Cl.³ ............................ B23B 3/26; B23B 7/00
[52] U.S. Cl. ..................................... 29/27 C; 82/2 F; 408/59; 409/136
[58] Field of Search .................. 82/1.2, 2 E, 2 A, 1.4, 82/1.5; 408/59, 152, 153, 154, 155, 157, 158; 409/136; 279/20

[56] References Cited

U.S. PATENT DOCUMENTS

| Re. 26,623 | 7/1969 | Erickson | 409/136 |
|---|---|---|---|
| 752,211 | 2/1904 | Duvall | 82/1.4 |
| 2,486,977 | 11/1949 | Peters | 82/2 E |
| 3,076,355 | 2/1963 | Heuser | 408/158 |
| 3,113,475 | 12/1963 | Lombardo | 408/152 X |
| 3,228,265 | 1/1966 | Stoddard et al. | 408/158 |
| 3,487,748 | 1/1970 | Grage | 409/136 |
| 3,753,624 | 8/1973 | Walker et al. | 408/159 |
| 3,817,648 | 6/1974 | Miller | 408/59 |
| 3,822,618 | 8/1974 | Tomenceak | 82/1 |
| 3,827,821 | 8/1974 | Swenson | 408/59 |
| 3,884,590 | 5/1975 | Skrentner et al. | 408/158 X |

Primary Examiner—Z. R. Bilinsky
Attorney, Agent, or Firm—Barnes, Kisselle, Raisch, Choate, Whittemore & Hulbert

[57] ABSTRACT

Particularly compact facing head structure including a housing having an axis of rotation and adapted to be directly secured to a rotating spindle for rotation about the axis of rotation thereof and slides secured to an end face of the housing for movement transversely of the axis of rotation of the housing, which facing head extends a minimum distance beyond the mounting face of the spindle. The slides may be arcuate whereby convex or concave surfaces may be machined.

One end of the actuating member may extend through the end face of the housing so that a boring tool may be secured to the end of the actuating member whereby simultaneous boring and facing operations may be accomplished with the facing head. The slides are spring biased in one direction in all positions thereof to compensate for centrifugal force, backlash and facing head wear.

Structure is provided for lubrication of the facing head under predetermined pressure with the facing head rotating. Passages are provided in the facing head for passing coolant to a workpiece through the head.

8 Claims, 13 Drawing Figures

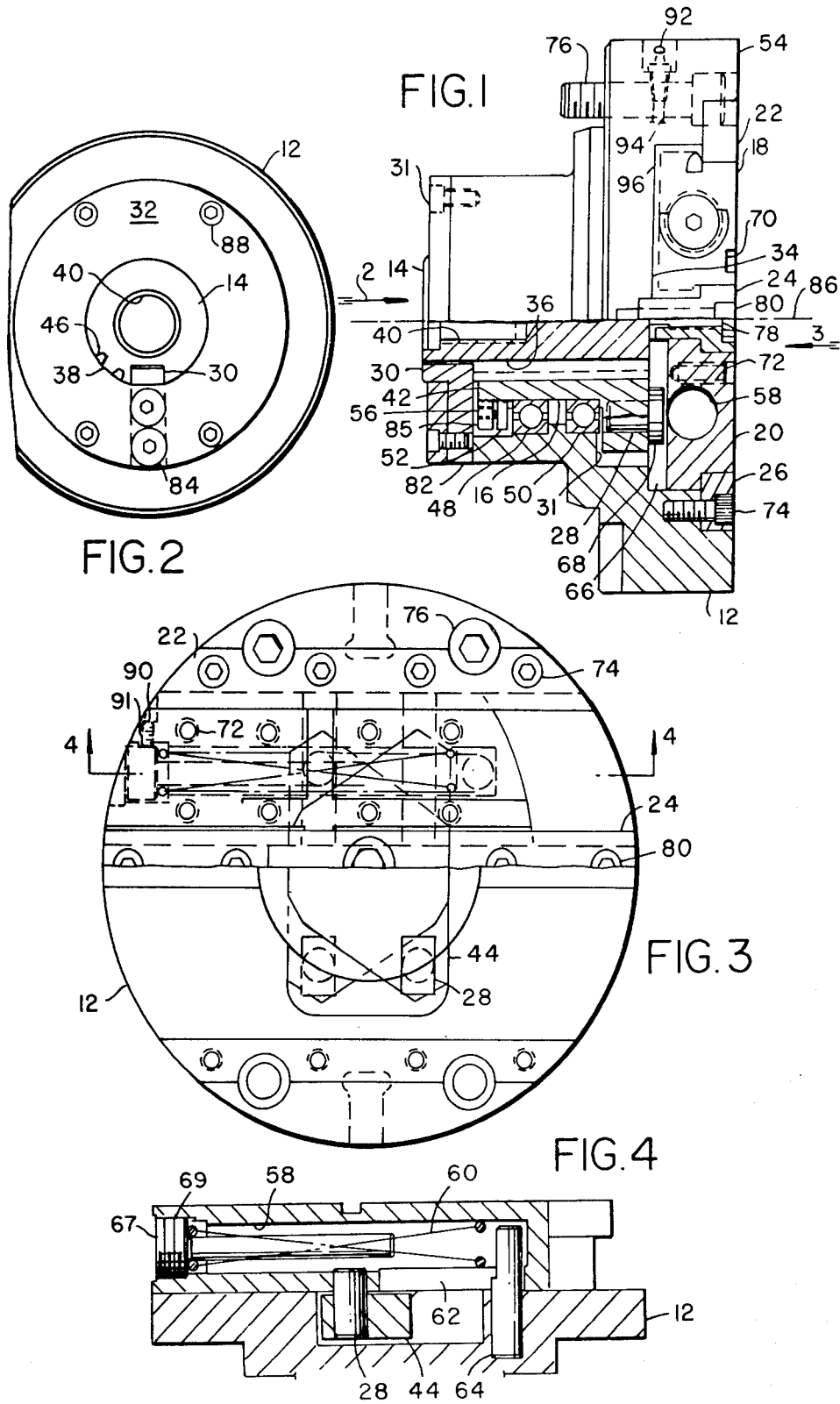

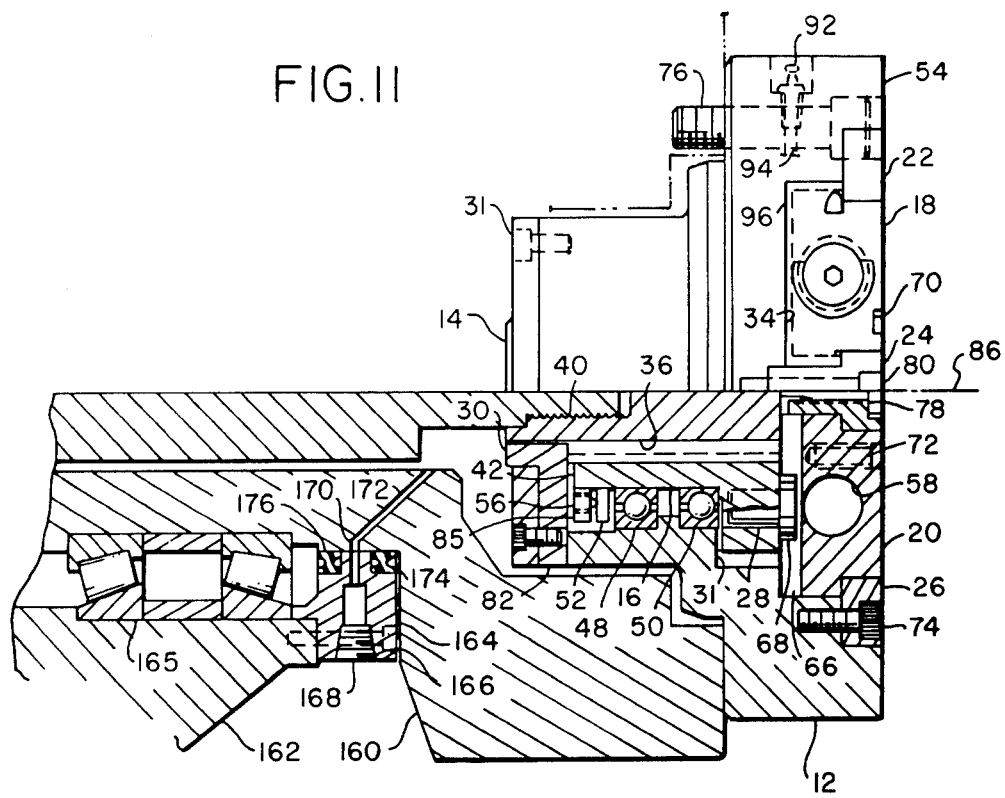

FACING HEAD

CROSS REFERENCE TO RELATED APPLICATIONS

The present application is a division of application Ser. No. 762,302 filed Jan. 25, 1977, which in now U.S. Pat. No. 4,197,040, which is a continuation-in-part application of application Ser. No. 641,937, filed Dec. 18, 1975, now U.S. Pat. No. 4,004,332.

BACKGROUND OF THE INVENTION

1. Field of the Invention

The invention relates to facing heads and refers more specifically to a facing head having a minimum axial dimension beyond the mounting surface thereof and which is capable in one embodiment of simultaneous boring and facing operations. The facing head includes slides movable transversely thereof which may be convex or concave and which are biased in one direction in all positions thereof, and structure for lubricating the facing head and/or passing coolant therethrough while the head is stationary and/or during rotation thereof.

2. Description of the Prior Art

In the past, facing heads have been unnecessarily extended from the spindles to which they are attached, thus causing undue lateral stresses on the spindle bearings and within the facing head structure itself. Further, facing heads of the past have often included particularly complicated structure for effecting transverse movement of a cutting tool relative to the axis of rotation of the facing head, which has increased the cost of such facing heads and lowered their efficiency.

Similarly, where simultaneous boring and facing have been accomplished in the past with facing heads, the structure for effecting such combined operations has cometimes been built into or been formed by a part of the associated spindles and usually has been complicated and expensive and sometimes inefficient. Also, prior facing heads have usually not included structure for machining convex and concave surfaces. Wherein structure for machining arcuate surfaces has been provided in the past, it has been complicated and expensive.

Prior facing heads have also often incorporated considerable backlash in the structure included therein for moving cutting tools transversely thereof which has prevented effective precision control of start and stop positions. More important, such backlash has often resulted in chatter of the cutting tools, shortening the life of the tools and cutting mechanism and often providing an undesirable finish on a machined workpiece. Prior facing heads have not included wear compensation structure therein. Also with such prior structures, and inconsistency in the finish of the work has also occurred during the transition which occurs when the center of gravity of the slide combined with any objects fastened to it crossed over the balance center of the facing head assembly.

Further, in the past, lubrication of facing heads usually has not been possible during operation of the heads, and lubrication in the past has been a manual operation. Coolant has usually not been supplied to a workpiece through prior facing heads.

SUMMARY OF THE INVENTION

Therefore, in accordance with the present invention, there is provided a facing head constructed and arranged to extend axially outwardly of an end of a spindle to which it is connected for rotation a minimum distance whereby wear of the facing head due to transverse forces on cutting tools carried thereby and wear on the spindle structure will be minimized. Such a facing head is constructed in accordance with the invention by means of a housing having transversely movable slides secured thereon, an actuating member having exterior helical cam teeth thereon which is held against rotation relative to the housing but permitted axial movement relative thereto, a cam member having helical internal cam teeth thereon engaged with the cam teeth on the actuating member fixed against axial movement but permitted angular movement relative to the housing, whereby the cam member is rotated on axial movement of the actuating member, and pin and slot structure operable between the slides and cam member for moving the slides transversely on the body member on rotation of the gear member. The slides may be either convex or concave whereby either convex or concave surfaces may be machined with tools secured thereto.

Simultaneous boring and facing with the facing head is accomplished in accordance with the invention by extending the actuating member beyond the front face of the facing head and securing a boring tool on the actuating member.

Backlash is removed from the slides by biasing the slides in one direction in all positions of movement thereof. Thus, wear of the head structure is compensated for and the effect of a relatively changing center of gravity of the facing head as a whole and the slide structure is minimized. Biasing the slides is accomplished by a pin secured to the facing head housing and a spring operable between a bolt in the slide and the pin.

Lubrication during operation of the facing head is provided through a lubrication fitting secured to spindle mounting structure through which lubricating fluid is placed inside of the spindle and facing head during rotation of the spindle. Sealing means are provided to prevent leakage of the lubricating fluid out of the facing head.

Coolant is passed through axial passages in the facing head to a workpiece.

BRIEF DESCRIPTION OF THE DRAWINGS

FIG. 1 is a partially broken away elevation view of a facing head constructed in accordance with the invention.

FIG. 2 is a partial end view of the facing head illustrated in FIG. 1, taken in the direction of arrow 2 in FIG. 1.

FIG. 3 is a partly broken away end view of the facing head illustrated in FIG. 1, taken in the direction of arrow 3 in FIG. 1.

FIG. 4 is a partial section view of the facing head illustrated in FIGS. 1-3, taken substantially on the line 4—4 in FIG. 3.

FIG. 11 is a partial elevation view, partial section view, showing the facing head of FIGS. 1–5 secured to a spindle having lubrication structure as shown in FIG. 9 in conjunction therewith.

FIG. 12 is a partially broken away elevation view showing a facing head similar to the facing head of FIGS. 1–5 and including a concave slide for machining convex surfaces.

FIG. 13 is a partially broken away elevation view showing a facing head similar to the facing head of FIGS. 1–5 and including a convex slide for machining concave surfaces.

DESCRIPTION OF THE PREFERRED EMBODIMENT

Figure 5:
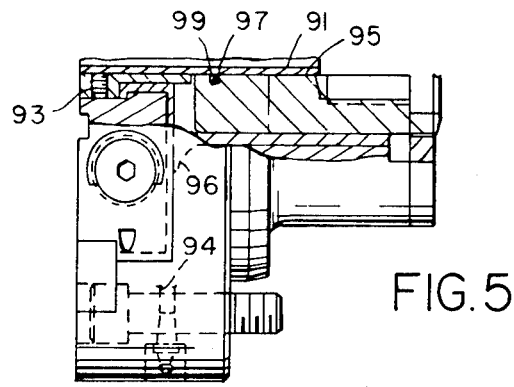
FIG. 5 is a partially broken away elevation view of the facing head illustrated in FIGS. 1-4 showing a coolant passage therein.

The facing head 10 illustrated best in FIGS. 1–4 includes a housing 12, and actuating member 14, cam or gear member 16, slides 18 and 20, keepers 22, 24 and 26, pin structure 28, key 30, and cover 32.

The housing 12 has a bore 31 extending axially therethrough having different diameter portions, as shown best in FIG. 1. Recesses 34 are provided extending across one end of the housing 12 for receiving the slides 18 and 20 for movement transverse to the axis of rotation of the facing head 10.

The actuating member 14 is generally cylindrical and, as shown best in FIG. 1, includes a keyway 36 extending longitudinally thereof. Actuating member 14 has external helical cam teeth 38, illustrated best in FIG. 2, extending along the length thereof. The actuating member 14 is adapted to receive the threaded end of an actuating rod through a spindle in the threaded recess 40 in one end face thereof.

Cam member 16 includes a hollow cylindrical body portion 42 extending axially of the actuating member and a flange portion 44 extending transversely of the head 10 and perpendicular to a spindle (not shown) to which the head 10 is adapted to be secured for rotation therewith and is shown best in FIGS. 1 and 3. Helical cam teeth 46, shown best in FIG. 2, are provided on the radially inner surface of the cylindrical body portion 42 of the cam member 16 whereby the cam member 16 is caused to rotate about the axis of generation 86 of the facing head 10 on axial movement of the actuating member 14.

The cam member 16 is mounted for rotation relative to the housing on the bearings 48 and 50. The cam member and bearings are secured in axial position relative to the housing by the nut 52 and screw 56.

Slides 18 and 20 are shaped in cross section, as shown best in FIG. 1. Openings 58 are provided in the slides 18 and 20 to receive biasing springs 60 therein, as best shown in FIG. 4. The openings 58 are further slotted at 62 to permit movement of the slides 18 and 20 past the pin 64, as will be considered subsequently, on movement of the slides transversely of the facing head. Each of the slides 18 and 20 is also provided with a slot 66 extending transversely thereacross for receiving the rectangular portion 68 of the pin structure 28 therein. The slots 70 and threaded openings 72 in the slides 18 and 20 are provided to permit securing of cutting tools thereto for facing operations or the like.

As shown, the keepers 22 and 26 are elongated rectangular members secured to the housing 12 by convenient means such as bolts 74. Both the keepers 22 and 26 as well as the housing 12 are recessed to provide access for the bolts 76 which are used to secure the facing head 10 to the end surface of a spindle or the like for rotation about the axis of rotation 86 of the housing 12.

The keeper 24 extends across the center of the facing head 10, as shown best in FIG. 3. The keeper 24 is generally T-shape in cross section, as shown best in FIG. 1. The depth of the T stem is less in the center than at the ends, again as shown best in FIG. 1, to accommodate the forward end of the actuating member 14. A stop screw 78 extends centrally through the keeper 24 to limit the forward movement of the actuating member 14 in operation. The bolts 80 at both ends of the keeper 24 secure the keeper 24 to the housing 12. The keepers 22 and 26 in combination with the keeper 24 maintain the slides 18 and 20 secured to the housing 12 for transverse movement across the end 54 of the facing head 10.

As shown, the key 30 is secured in a slot 82 in the housing 12 and is held in a predetermined position on the cover 32 by the bolts 84. Cover 32 is secured over the end 85 of the facing head 10 by means of the bolts 88, shown best in FIG. 2.

Again as shown best in FIG. 4, the spring 60 is positioned within the opening 58 through the slides 18 and 20 and is held in place therein by means of the bolt 67 having the threaded head 69. The axial position of the bolt 66 may be changed to vary the compression of the spring 60. The bolt 66 is locked in adjusted position by means of a set screw 90 and brass plug 91, illustrated best in FIG. 3. In operation, the spring acts between the pin 64 and the head 69 of the bolt 67 to bias the slides in one direction over the full length of the slides transversely of the facing head 10.

The facing head 10 is provided lubrication manually through the radially extending lubricating fitting 92 and passage 94 in the housing 12. Sealing means 96 extend around the slides 18 and 20, as shown best in FIG. 1, to prevent loss of lubricating fluid from the facing head 10 on movement of the slides 18 and 20. Lubrication of the facing head 10 may, while it is rotating, also be accomplished by structure such as that of FIG. 9, as will be considered subsequently and as shown in FIG. 11.

In overall operation, the facing head 10 is secured to one end face of a spindle of a boring machine or the like by the bolts 76 and the actuating member 14 is coupled to an actuating rod extending through the center of the spindle by screwing the actuating rod into the threaded recess 40 in the actuating member 14. Then, with cutting tools as desired secured to the slides 18 and 20, when the actuating rod is moved axially to axially move the actuating member 14, the cam member 16 is caused to rotate in the bearings 48 and 50 to arcuately move the pin structures 28 and to thus cause simultaneous sliding movement of the slides 18 and 20 in opposite directions and sliding movement of the rectangular head 68 of the pin structures 28 within the slots 66 in the slides. The cutting tools secured to the slides 18 and 20 are thus caused to move transversely of the facing head 10, as desired.

In this movement it will be noted that the slides 18 and 20 are biased in one direction for the entire movement of the slides 18 and 20. Thus, as shown best in solid lines in FIG. 3, with the pin structure 28 in one of its limiting positions with the flange 44 of the cam member 16, the spring 60 biases the slide to the left and the slide 18 is in its leftmost position, as shown in FIG. 4. On rotating of the cam member 16 into its alternate limiting position, as shown by the broken lines in FIG. 3, the pin structure 28 is moved to the right and ultimately assumes a position similar to that shown in FIG. 7 wherein the slide 18 is in its rightmost position. The slide 18 is continually biased to the left by the spring 60 during this entire movement. Consequently, no backlash is permitted and there is no unbalanced slide and/or cutting tool action as the center of gravity of the slide and cutting tool crosses over the center of gravity of the facing head assembly. Thus, chatter and/or damaged surfaces on pieces being machined at this point in a machining operation are substantially eliminated by the facing head structure of the invention. Further, the bias on the slides compensates for wear in the facing head 10. Thus, the facing head will have a longer life and more precision control of start and stop positions of the facing head are possible.

The modified facing head 10 shown in FIG. 5 includes a tube 91 secured in keeper 24 by screw 93. Tube 91 extends into passage 95 in actuating member 14 and is sealed by seal 97 in the internal groove 99 in passage 95. With such structure, coolant may be passed through actuating member 14 and tube 91 axially of the facing head 10 to a workpiece as desired.

Figure 6:
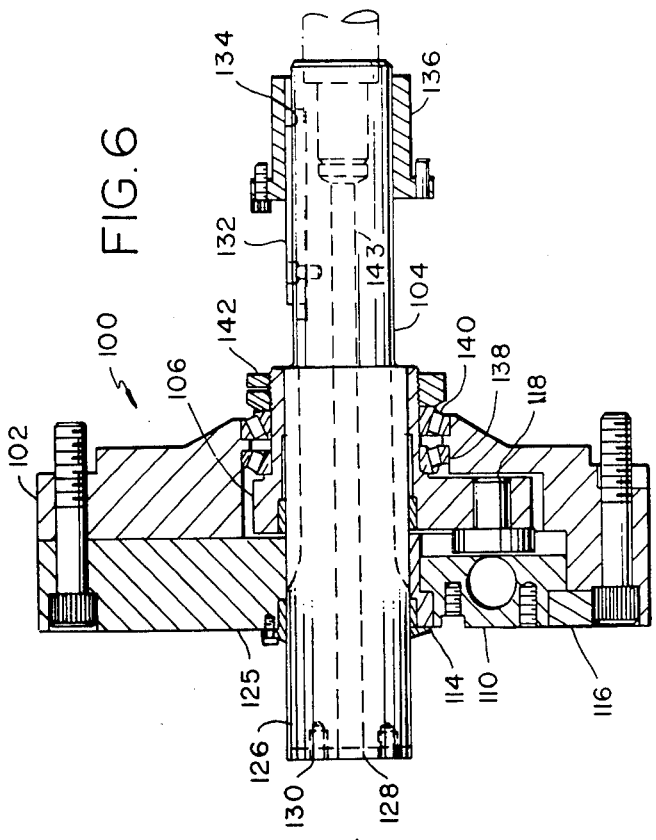
FIG. 6 is a longitudinal section view of a facing head constructed in accordance with the invention for simultaneous boring and facing operations, taken substantially on the line 6-6 in FIG. 7.

The embodiment of the facing head 100 illustrated in FIG. 6 permits both boring and facing of a workpiece, for example, simultaneously. As shown in FIG. 6, the facing head 100 again includes a housing 102, an actuating member 104, a cam member 106, and slides 108 and 110 held in place in the housing 102 by keepers 112, 114 and 116. The pin structures 118 are rotatably secured in the cam member 106 and serve to cause the slides 108 and 110 to move transversely of the facing head 100 on axial movement of the actuating member 104 relative to the housing 102, as above.

Also as above, the slides 108 and 110 are biased by means of a spring 120 in one direction over the entire movement thereof operating between the bolt 122 and pin 124 secured in the slide 108 and housing 102, respectively. Backlash is again thus minimized in the facing head 100, and wear and the effect of relatively moving centers of gravity is compensated for, as indicated above.

The actuating member 104 illustrated best in FIG. 6 has a portion 126 which extends beyond the end surface 125 of the facing head 100 which includes both slots 128 and threaded openings 130 whereby a boring tool may be mounted thereon.

Further, in the generating head 100, a key 132 is secured to the actuating member 104 and moves in a keyway 134 in a member 136 held in a fixed position with respect to the housing 102 in operation as for example the spindle.

Again, then, as the actuating member is moved forward to effectuate boring with a boring tool secured to the portion 126 thereof, the cam member 106 is caused to rotate in the bearings 138 and 140 held in position by the lock nut 142 to rotate the pin structures 118 and thus cause the slides 108 and 110 to slide transversely of the facing head, whereby facing tools secured to the slides 108 and 110 can perform a facing operation simultaneously with the boring operation.

Coolant may be passed to a workpiece through the passage 143 in the actuating member 104 axially of the facing head 100.

Figure 9:
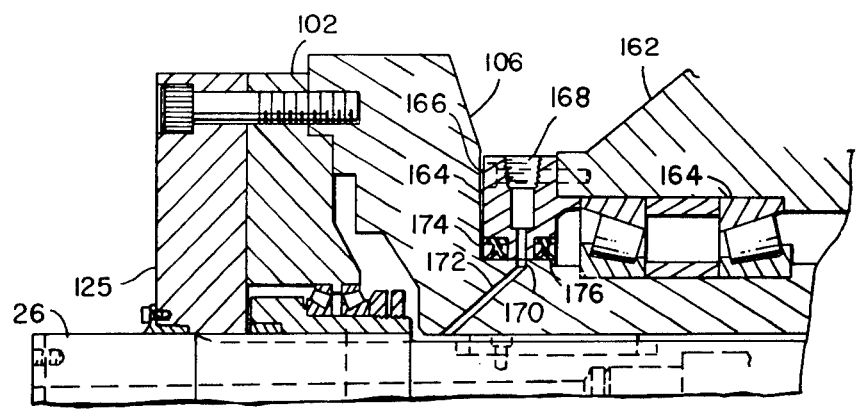
FIG. 9 is a partial section view of a modification of the facing head illustrated in FIG. 6, showing alternate key means for preventing rotation of the actuating member while permitting axial reciprocation thereof.

The embodiment 100 of the facing head is shown secured to a spindle 160 in FIG. 9. The spindle 160 is rotatably mounted in a stationary member 162 in bearings 165. An annular lubricating member 164 is bolted to the stationary member 162 by bolts 166. A lubrication passage 168 is provided in member 164 to receive a lubricating fitting (not shown). The passage 168 terminates in an annular groove 170 in the spindle 160 which in turn communicates with spindle passage 172. Annular seals 174 and 176 are provided between member 164 and spindle 160.

In operation, lubricant under predetermined pressure may be passed through passage 168, groove 170 and passage 172 to lubricate the facing head 100 and spindle 160 while the facing head is operating and the spindle is rotating.

Figure 10:
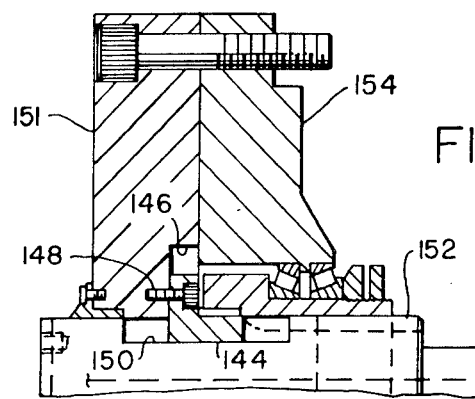
FIG. 10 is a partial elevation view of the facing head illustrated in FIGS. 6–8, together with a partial section view of the spindle structure to which it is secured and showing structure for lubricating the facing head in operation with the head rotating in accordance with the invention.
Figure 7:
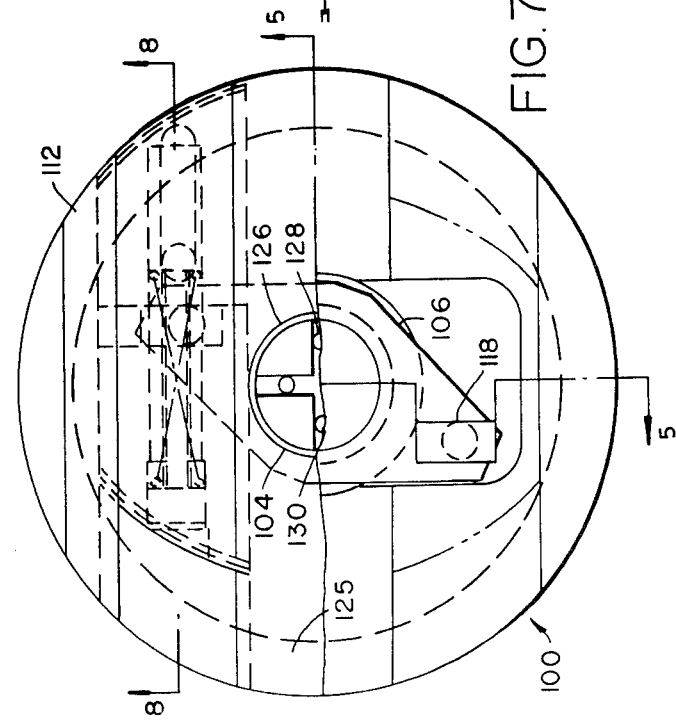
FIG. 7 is a partly broken away end view of the facing head illustrated in FIG. 6, taken in the direction of arrow 7 in FIG. 6.
Figure 8:
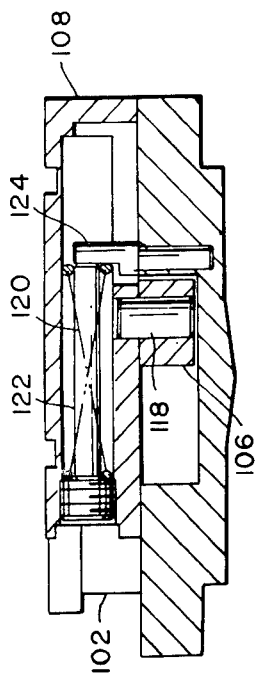
FIG. 8 is a partial section view of the facing head illustrated in FIGS. 6 and 7, taken substantially on the line 8—8 in FIG. 7.

The modification of the embodiment 100 of the facing head illustrated in FIG. 10 is exactly the same as the embodiment of FIGS. 6-8 except that the key 144 has been positioned in a recess 146 in the keeper 151 and is held therein by bolt 148. The key 144 extends into a keyway 150 in the actuating member 152 to permit axial movement of the actuating member 152 with respect to the housing and the actuating member as before.

FIG. 11 illustrates that the different features of the modifications of the invention shown in FIGS. 1-10 may be combined in ways other than that shown. Thus, for example, as shown in FIG. 11, the lubricating structure shown in FIG. 9 is utilized with the facing head illustrated in FIGS. 1-4.

FIG. 12 is a modification of the facing head of FIGS. 1-4 which is useful in machining convex surfaces. Thus, the slide 202 of the modified facing head 200 illustrated in FIG. 12 is concave and moves in concave guides 204 on rotation of the gear 206. The tool 208, which is secured to the slide 202, will be moved in an arcuate path to machine a convex surface on rotation of the gear 206 through the interaction of the pin 210 rotating in the bearing 212. The bearing pivots about its center in the outer block 214 which receives it. The block 214 moves transversely of the guides 204 in the transverse slot 216 in the slide 202 to produce movement of the slide 202 in the arcuate guides 204.

The modified facing head structure 220 illustrated in FIG. 13 is substantially the same as the modified structure 200 of FIG. 12 except that the slide 222 is convex and the guides 224 are similarly convex whereby the tool 226 is moved in a concave path on rotation of the gear 226. The modified facing head 220 is thus adapted to machine concave surfaces.

It will be understood that other embodiments and modifications of the invention are contemplated. It is the intention to include all such embodiments and modifications within the scope of the invention as are defined by the appended claims.

What I claim as my invention is:

1. A facing head having an axis of generation and an end surface including radially movable means movable only in a plane perpendicular to the axis of generation for holding a cutting tool adapted to contact a workpiece surface to be faced and means for passing coolant to a workpiece through the end surface of the facing head on the axis of generation of the facing head.

2. Structure as set forth in claim 1, and further including an actuating member extending on the axis of generation of the facing head and wherein the means for passing coolant to a workpiece through the end surface of the facing head on the axis of generation of the facing head, comprises a passage extending axially through the actuating member.

3. A facing head having an axis of generation and at least one end to be secured to a spindle for rotation therewith about its axis of generation comprising a housing, at least one slide transversely slidably supported on one end of the head in a plane perpendicular to the axis of generation, an actuating member positioned centrally of the head on the axis of generation and having an end extending through the one end of the facing head, means operable between the actuating member and slide for producing movement of the slide transversely of the head in a plane perpendicular to the axis of generation on movement of the actuating member axially of the head on the axis of generation of the head and means for passing coolant to a workpiece through the one end of the facing head on the axis of generation of the facing head.

4. Structure as set forth in claim 3, wherein the means for passing coolant to a workpiece through one end of the facing head on the axis of generation of the facing head comprises a passage extending axially through the actuating member and through the end of the facing head on the axis of generation of the facing head.

5. A facing head adapted to be secured directly to a spindle for rotation therewith, comprising a housing, means for securing the housing to the spindle, at least one slide transversely slidably supported on one end of the facing head, an actuating member positioned centrally of the facing head, cam means operable between the actuating member and slide for producing movement of the slide transversely of the facing head on movement of the actuating member axially of the facing head including a cylindrical cam member having a flange extending transversely of the actuating member and internal helical cam teeth and external helical cam teeth on the actuating member meshed with the cam teeth on the cam member, means for restraining the actuating member from rotating relative to the housing, means operable between the cam member and slide for producing transverse movement of the slide on rotary movement of the cam member, including a slot extending transversely of the slide and a pin including a rectangular portion positioned within the slot in the slide and a cylindrical portion rotatably received within the flange of the cam member and means for passing coolant to a workpiece through the facing head axially of the facing head.

6. A facing head adapted to be secured directly to a spindle for rotation therewith, comprising a housing, means for securing the housing to a spindle from the front of the facing head, at least one slide transversely slidably supported on one end of the facing head, an actuating member positioned centrally of the facing head, cam means operable between the actuating member and slide for producing movement of the actuating member axially of the facing head, means for biasing the slide in one direction over its entire movement transversely of the facing head, including a pin secured in the housing and extending into the slide, a slot in the slide for permitting movement on the slide over the pin, and spring means positioned within the slide operable between the slide and pin and means for passing coolant to a workpiece through the facing head axially of the facing head.

7. A facing and boring head adapted to be secured to a spindle for rotation therewith comprising at least one slide transversely slidably supported on one end of the head, an actuating member positioned centrally of the head, means operably between the actuating member and slide for producing movement of the slide transversely of the head on movement of the actuating member axially of the head and a cutting tool for facing secured to the slide, means for simultaneously boring while facing comprising one end of the actuating member extending axially beyond the outer end of the head and a boring tool secured to the one end of the actuating member and means for passing coolant to a workpiece through the facing head axially of the facing head.

8. A facing head, comprising a housing, at least one slide transversely slidably supported on one end of the facing head, means for securing a facing tool to the slide, an actuating member positioned centrally of the facing head and means positioned between the actuating member and slide for producing transverse movement of the slide on the facing head on movement of the actuating member axially of the facing head to effect facing with the facing head, including external cam teeth on the actuating member, a cylindrical cam member sleeved over the actuating member having internal helical cam teeth meshed with the cam teeth on the actuating member, means for transversely moving the slide on rotation of the cam member positioned between the cam member and slide, means secured to the facing head for movement axially of the facing head to effect simultaneous boring while facing with the facing head in response to movement of the actuating member axially of the facing head and means for passing coolant to a workpiece through the facing head axially of the facing head.

* * * * *